US008437322B1

(12) United States Patent
Klingen et al.

(10) Patent No.: US 8,437,322 B1
(45) Date of Patent: May 7, 2013

(54) METHOD AND SYSTEM FOR COMMUNICATING FIXED IP ADDRESS BASED VOICE DATA IN A DYNAMIC IP ADDRESS BASED NETWORK ENVIRONMENT

(75) Inventors: Mike Klingen, Phoenix, AZ (US); Paul D. Coppinger, Mesa, AZ (US)

(73) Assignee: Apriva, LLC, Scottsdale, AZ (US)

( * ) Notice: Subject to any disclaimer, the term of this patent is extended or adjusted under 35 U.S.C. 154(b) by 451 days.

(21) Appl. No.: 12/553,950

(22) Filed: Sep. 3, 2009

(51) Int. Cl.
  *H04W 4/00* (2009.01)
  *H04J 3/24* (2006.01)
  *H04L 12/66* (2006.01)
  *H04L 12/56* (2006.01)

(52) U.S. Cl.
  USPC .......... 370/338; 370/349; 370/352; 370/401; 455/465

(58) Field of Classification Search ............... 370/310.2, 370/338, 349, 352, 356–357, 389, 395.2, 370/395.52, 396, 400–401, 455, 466, 471; 455/432.1–466; 709/201–203, 217–244
  See application file for complete search history.

(56) References Cited

U.S. PATENT DOCUMENTS

| 6,404,754 | B1 * | 6/2002 | Lim ............................. 370/338 |
| 6,427,174 | B1 | 7/2002 | Sitaraman et al. |
| 6,738,803 | B1 | 5/2004 | Dodrill et al. |
| 7,016,328 | B2 | 3/2006 | Chari et al. |
| 7,076,251 | B2 | 7/2006 | Jagadeesan et al. |
| 7,133,384 | B2 | 11/2006 | Park et al. |
| 7,228,558 | B1 | 6/2007 | Lebouill |
| 7,310,527 | B2 | 12/2007 | Jagadeesan et al. |
| 7,440,459 | B2 | 10/2008 | Casati |
| 7,499,440 | B2 * | 3/2009 | Nakajima et al. ............. 370/338 |
| 7,586,879 | B2 | 9/2009 | Chari et al. |
| 7,630,341 | B2 * | 12/2009 | Buddhikot et al. ........... 370/331 |
| 7,649,866 | B2 * | 1/2010 | Chari et al. .................... 370/331 |
| 7,792,972 | B2 * | 9/2010 | Kamata et al. ................ 709/227 |
| 7,873,993 | B2 | 1/2011 | King |
| 7,945,697 | B2 * | 5/2011 | Fan et al. ....................... 709/245 |
| 8,059,641 | B1 * | 11/2011 | Rai ............................. 370/389 |
| 8,060,017 | B2 | 11/2011 | Schlicht et al. |
| 2001/0046215 | A1 | 11/2001 | Kim |
| 2002/0009066 | A1 * | 1/2002 | Shimizu et al. ............... 370/338 |
| 2002/0068554 | A1 | 6/2002 | Dusse |
| 2002/0154627 | A1 | 10/2002 | Abrol et al. |

(Continued)

OTHER PUBLICATIONS

Office Action dated Jun. 27, 2011 in U.S. Appl. No. 12/553,901.

(Continued)

*Primary Examiner* — Tri H Phan
(74) *Attorney, Agent, or Firm* — Snell & Wilmer LLP

(57) ABSTRACT

A mobile communication device encapsulates a fixed IP address based voice data packet (containing a fixed source IP address of the mobile communication device, a fixed destination IP address of a receiving device, and a voice data payload) into a sending network voice data packet (containing a sending network source IP address of the mobile communication device, a sending network destination IP address of an intermediate system, and the fixed IP address based voice data packet) and provides the sending network voice data packet over a first dynamic IP address based network to the intermediate system for decapsulating the fixed IP address based voice data packet from the sending network voice data packet, encapsulating the fixed IP address based voice data packet into a receiving network voice data packet and providing the receiving network voice data packet over a second dynamic IP address based network to the receiving device.

20 Claims, 4 Drawing Sheets

U.S. PATENT DOCUMENTS

| | | |
|---|---|---|
| 2005/0076069 A1 | 4/2005 | Deo et al. |
| 2005/0213574 A1 | 9/2005 | Yoshimura et al. |
| 2006/0056393 A1 | 3/2006 | Sarmiento |
| 2006/0083199 A1 | 4/2006 | Yang |
| 2006/0133341 A1 | 6/2006 | Chari et al. |
| 2006/0182131 A1 | 8/2006 | Dziekan, Jr. |
| 2007/0115899 A1* | 5/2007 | Ovadia et al. ............. 370/338 |
| 2007/0121849 A1* | 5/2007 | Uhlik et al. ............. 379/114.28 |
| 2008/0056295 A1 | 3/2008 | Loda et al. |
| 2008/0200168 A1* | 8/2008 | Jiang ............. 455/432.1 |
| 2009/0158398 A1 | 6/2009 | Pandey et al. |
| 2010/0267383 A1 | 10/2010 | Konstantinou et al. |

OTHER PUBLICATIONS

Office Action dated Dec. 21, 2011 in U.S. Appl. No. 12/553,947.
Office Action dated Feb. 17, 2012 in U.S. Appl. No. 12/553,908.
Office Action dated Mar. 15, 2012 in U.S. Appl. No. 12/553,937.
Final Office Action dated Jan. 18, 2012 in U.S. Appl. No. 12/553,901.
Office Action dated Aug. 8, 2012 in U.S. Appl. No. 12/553,901.
Office Action dated Sep. 11, 2012 in U.S. Appl. No. 12/553,947.
Final Office Action dated Oct. 15, 2012 in U.S. Appl. No. 12/553,937.
Final Office Action dated Oct. 17, 2012 in U.S. Appl. No. 12/553,908.

* cited by examiner

US 8,437,322 B1

METHOD AND SYSTEM FOR COMMUNICATING FIXED IP ADDRESS BASED VOICE DATA IN A DYNAMIC IP ADDRESS BASED NETWORK ENVIRONMENT

FIELD OF THE INVENTION

The present invention relates to data communication and, more particularly, packet-based voice data communication.

BACKGROUND OF THE INVENTION

Packet switched networks are now widely used for voice communication. The Internet, with its widespread and affordable accessibility, has become a desirable and increasingly popular vehicle for such voice communication. For example, Voice over Internet Protocol (VoIP) allows for voice communication between devices (such as a computer or appropriately configured digital telephone) over the Internet Protocol (IP) commonly used in data transmission over the Internet. VoIP has become increasingly popular as it offers a number of advantages over traditional circuit switched networks in areas such as cost and flexibility.

Voice communication over the Internet has conventionally required the use of fixed (unchanging) internet protocol (IP) addresses to identify the locations of and route the voice data between the communicating devices during a call. For example, VoIP utilizes the Session Initiation Protocol (SIP) which establishes and manages a voice communication session using IP addresses of the devices that have been registered with a SIP server. A calling device obtains from the SIP server the IP address of a device to be called and then, if the call is answered and engaged, sends voice data packets to that IP address. The called device similarly obtains the IP address of the calling device and sends voice packets to that IP address in a similar fashion.

With the increasingly widespread use of mobile communication devices such as personal digital assistants (PDAs) and mobile telephones with Internet access it becomes desirable to provide their users with the ability to utilize the Internet in voice communication. Such mobile devices, however, are typically deployed on wireless carrier networks that require them to have, due to their mobility, dynamic (potentially changing) IP addresses. This renders them inappropriate for reliable voice communication over the Internet for which fixed IP addresses are normally utilized as described above.

In a VoIP call utilizing SIP, for example, if the IP address of a first communication device changes, voice packets sent by a second communication device would continue to be sent to the old IP address and thus would not be received by the first communication device. Furthermore, the second communication device would not recognize packets received from the new IP address as being from the first communication device. At that point, communication could not continue until the call is re-established. Such an interruption creates an undesirable disruption in the flow of communication, causes time-consuming delays and, where critical subject matter is being communicated, could have serious consequences.

A means is therefore desired for communicating fixed IP address based voice data in a dynamic IP address based communication environment.

BRIEF DESCRIPTION OF THE DRAWINGS

The invention is described in terms of the preferred embodiments set out below and with reference to the following drawings in which like reference numerals are used to refer to like elements throughout.

DETAILED DESCRIPTION OF THE PREFERRED EMBODIMENTS

In an embodiment of the invention described herein, a method and system are provided for communicating fixed Internet Protocol (IP) address based voice data in a dynamic IP address based network environment. An intermediate system is provided between a sending mobile communication device and a receiving mobile communication device. The intermediate system is connected to a "sending" network on which the sending device is deployed and is further connected to a "receiving" network on which the receiving device is deployed.

The sending mobile communication device includes a fixed IP address based voice application such as a Voice over Internet Protocol (VoIP) application which sends voice data in fixed IP address based voice packets, each containing a fixed source IP address of the sending device, a fixed destination IP address of the receiving device, and a voice data payload comprising a portion of the voice data. The sending device is provided with a mobile encapsulator which encapsulates each fixed IP address based voice data packet into a sending network voice data packet containing a sending network source IP address of the mobile communication device, a sending network destination IP address of the intermediate system, and the encapsulated fixed IP address based voice data packet. The sending mobile device then sends the sending network voice data packet over the sending network to the intermediate system.

The intermediate system includes a voice data controller which decapsulates the fixed IP address based voice data packet from the sending network voice data packet. The voice data controller then encapsulates the fixed IP address based voice data packet into a receiving network voice data packet containing a receiving network source IP address of the intermediate system, a receiving network destination IP address of the receiving device, and the fixed IP address based voice data packet. The intermediate system then provides the receiving network voice data packet over the receiving network to the receiving mobile communication device.

The receiving mobile communication device includes a fixed IP address based voice application, corresponding to the fixed IP address based voice application on the sending device. The receiving device is also provided with a mobile encapsulator which decapsulates the fixed IP address based voice data packet from the receiving network data packet. Thereafter, the fixed IP address based voice data packet is provided to the fixed IP address based voice data application on the receiving device.

Figure 1:
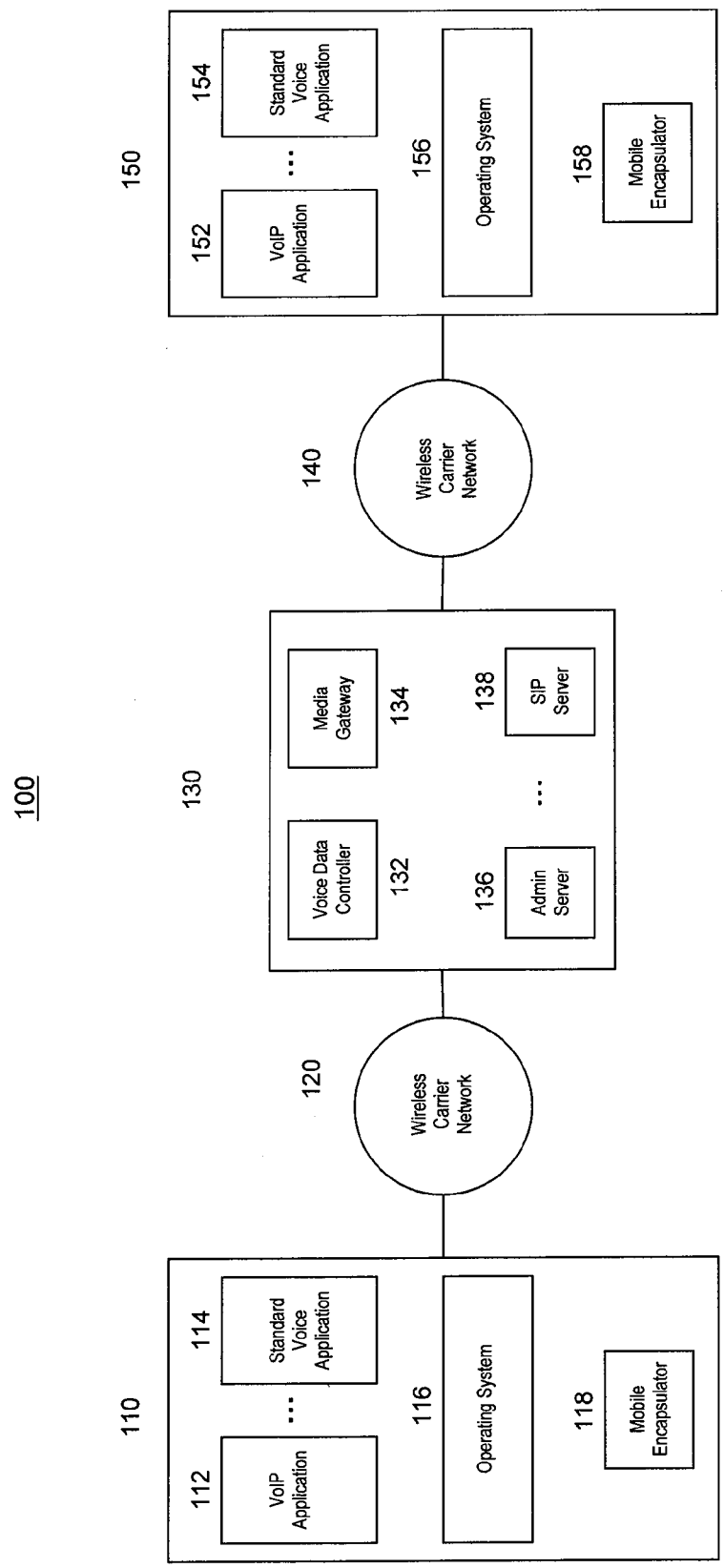
FIG. 1 is a block diagram illustrating a system in which voice data communication is provided in accordance with an embodiment of the present invention.

FIG. 1 is a block diagram illustrating a system in which voice data communication is provided in accordance with an embodiment of the present invention. As shown in FIG. 1, a voice communication system 100 includes a mobile communication device 110 deployed on a wireless carrier network 120. A network operation center 130 is connected to the wireless carrier network 120 as well as a wireless carrier network 140 on which a mobile communication device 150 is deployed.

The wireless carrier network 120 and wireless carrier network 140 can each be any network at least a non-local portion of which is wireless so as to allow for mobility of communication devices sufficient to cause their IP addresses to change. Such a wireless carrier network may be, for example, a cellular network that identifies the mobile devices deployed thereon using dynamic IP addresses that can change as the device moves among different geographical zones utilizing different cells. Although shown as separate networks to distinguish the potentially different networks on which the mobile communication device 110 and mobile communication device 150 can be deployed, it should be understood that the wireless carrier network 120 and wireless carrier network 140 could be a same physical network or different physical networks, depending on the carrier utilized by the user of each mobile device. In either case, they are distinguished from each other in the description corresponding to the separate mobile communication devices deployed thereon.

The mobile communication device 110 and mobile communication device 150 can each be, for example, any commercially available handheld communication device (such as an appropriately configured mobile telephone or personal digital assistant (PDA) to which the necessary functionality is added for communication of VoIP data over a dynamic IP address based network in accordance with embodiments of the invention described herein. One of ordinary skill in the art will understand that the mobile communication device 110 and mobile communication device 150 will each have the necessary hardware to operate as such including, for example, a processor, memory, display, keyboard and/or touch screen, microphone, speaker, transceiver, and so forth. Accordingly, the mobile communication device 110 and mobile communication device 150 will each be described below in terms of its most significant logical components.

The mobile communication device 110 is provided with a VoIP application 112 in addition to the standard voice application 114 that would normally be provided with the commercially available device on which the mobile communication device 110 is based. The VoIP application 112 performs essentially as a conventional Voice over Internet Protocol (VoIP) software application would perform to provide VoIP communication capability to a stationary telephone or computer that would typically have a fixed internet protocol (IP) address for the duration of a VoIP call but, as will be described, is further provided with the functionality necessary for voice communication system 100 to operate as described herein.

The operating system 116 runs applications such as the VoIP application 112 and the standard voice application 114. The operating system 116 is, for example, the Windows Mobile® operating system from Microsoft Corporation. The operating system 116 includes a network stack such as a TCP/IP protocol stack which includes packetizing and depacketizing functions performed on data, such as voice data, communicated to and from the mobile communication device 110.

The mobile encapsulator 118 performs encapsulation and decapsulation functions, as will be described, on voice data packets communicated to and from the mobile communication device 110. One of ordinary skill in the art will recognize, in accordance with the description herein, implementation options for the mobile encapsulator 118 that will be appropriate for the environment and circumstances at hand. One such option is to implement the encapsulation and decapsulation functions described herein using packet capture software that works as a writable extension of the operating system 116. This allows for the encapsulation and decapsulation functions to be performed while requiring minimal revisions to the VoIP application 112.

The mobile encapsulator 118 can be implemented, for example, as a Deterministic Network Extender (DNE) plug-in that performs encapsulation functions on voice data packets prior to sending the packets over the wireless carrier network 120 and performs decapsulation functions on voice data packets after receiving them over the wireless carrier network 120. DNE, as originally provided by Deterministic Networks, Inc., now acquired by Citrix Systems, Inc., allows for a logical extension of the operating system to capture, analyze and modify data packets. The mobile encapsulator may also be implemented using open source packet capture solutions such as, for example, libpcap, provided by the Tcpdump team, or WinPcap, provided by CAGE Technologies.

The network operation center 130 processes voice data communications between devices such the mobile communication device 110 and mobile communication device 150. The network operation center 130, which may perform a number of additional functions related to controlling, handling and securing data communicated by various devices, is implemented as a computer system that may be equipped with appropriate networking and computing devices, routers, servers, and so forth. The network operation center 130 includes a voice data controller 132 which performs encapsulation and decapsulation functions with respect to voice data packets communicated between mobile devices such as mobile communication device 110 and mobile communication device 150, as will be explained in more detail below.

The network operation center 130 further includes a media gateway 134 for communication by means (not shown) other than a wireless carrier network, including fixed IP address based communication such as VoIP over a cable modem, ISDN or DSL, or non-packet network communication such as conventional telephone communication over the public switched telephone network (PSTN). The network operation center 130 further includes an administrative server 136 which maintains information on devices registered to communicate via the network operation center 130, as well as a Session Initiation Protocol (SIP) server for controlling SIP sessions between VoIP devices.

The mobile communication device 150 may be a same or different type or brand of mobile device as the mobile communication device 110 but is also configured, as described above with reference to the mobile communication device 110, for communication of fixed IP address based voice data such VoIP data over a dynamic IP address based network such as wireless carrier network 120. The mobile communication device 150 is provided with a VoIP application 152 in addition to a standard voice application 154. The VoIP application 152 performs essentially as a conventional Voice over Internet Protocol (VoIP) software application would perform to provide VoIP communication capability to a stationary telephone or computer that would typically have a fixed internet protocol (IP) address for the duration of a VoIP call but, as will be described, is further provided with the functionality necessary for voice communication system 100 to operate as described herein.

The operating system 156 runs applications such as VoIP application 152 and the standard voice application 154. The operating system 156 is, for example, the Windows Mobile® operating system from Microsoft Corporation. The operating system 156 includes a network stack such as a TCP/IP protocol stack which includes packetizing and de-packetizing functions performed on data, such as voice data, communicated to and from the mobile communication device 150.

The mobile encapsulator 158 performs encapsulation and decapsulation functions, as will be described, on voice data packets communicated to and from the mobile communication device 150. As explained above with reference to the mobile encapsulator 118, one of ordinary skill in the art will recognize appropriate implementation options for the mobile encapsulator 158, such as via packet capture software provided as a logical extension to the operating system. As explained with respect to the mobile encapsulator 118, the mobile encapsulator 158 can be implemented, for example, as a DNE plug-in or as an open source packet capture solution that performs encapsulation functions on voice data packets prior to sending the packets over the wireless carrier network 140 and performs decapsulation functions on voice data packets after receiving them over the wireless carrier network 140.

Figure 2:
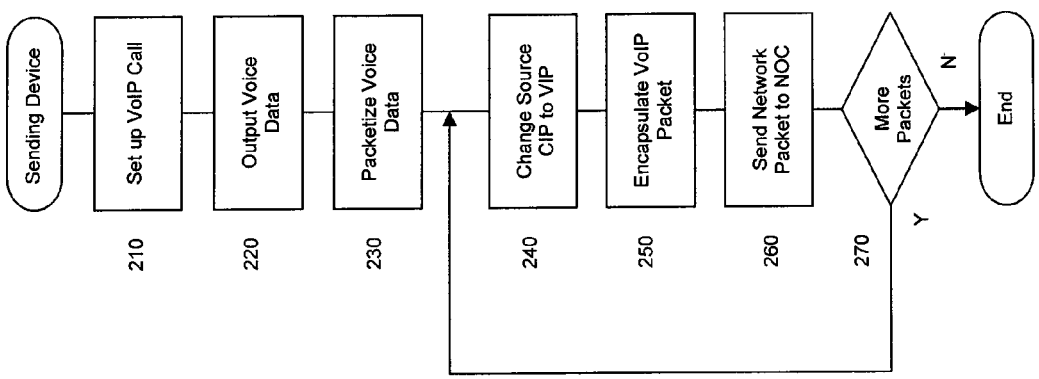
FIG. 2 is a flow diagram illustrating the process performed by a sending device in accordance with an embodiment of the present invention.

FIG. 2 is a flow diagram illustrating the process performed by a sending device in accordance with an embodiment of the present invention. The sending device can be any mobile communication device in voice communication system 100, configured as described with respect to mobile communication device 110 or mobile communication device 150, while in the process of sending voice data to a receiving device via the network operation center 130. It should be understood that any mobile communication device such as mobile communication device 110 or mobile communication device 150 may be either a sending or receiving device at a given time and would typically function as both during two-way voice communication.

The terms "sending" and "receiving" are used herein to describe the device with respect to the function being described when the term is used. Similarly, the terms "sending" and "receiving" will be used to refer to the dynamic IP address based networks such as wireless carrier network 120 or wireless carrier network 140, and the data packets that are communicated over them, based on the functions being performed to which the description relates.

The exemplary description to follow tracks a voice data communication from mobile communication device 110 to mobile communication device 150. In this description, the mobile communication device 110 will be referred to as the sending device and wireless carrier network 120 will be referred to as the sending network, while mobile communication device 150 will be referred to as the receiving device and wireless carrier network 140 will be referred to as the receiving network.

Figure 3:
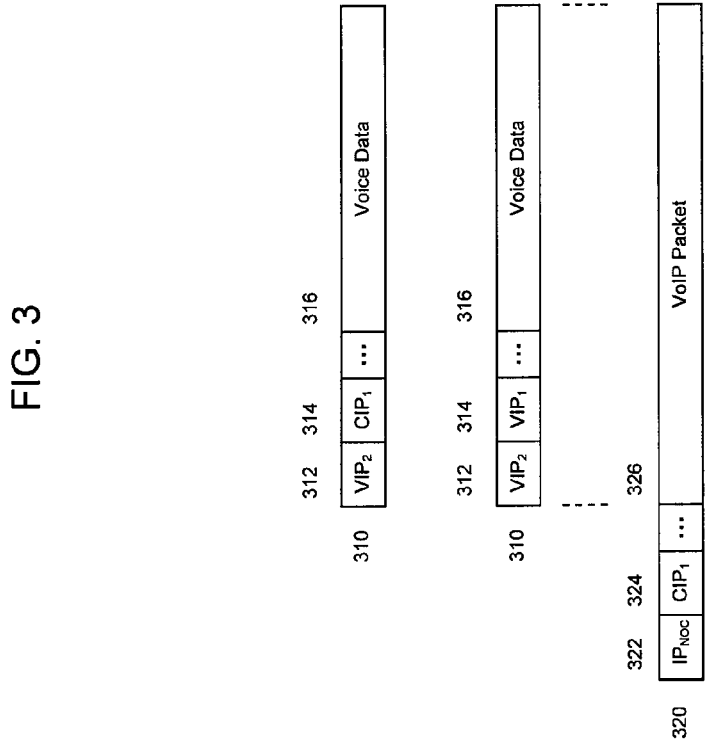
FIG. 3 is a block diagram illustrating encapsulation of a fixed IP address based data packet into a sending network data packet performed by a sending device in accordance with an embodiment of the present invention.

The process of FIG. 2 will be described with reference to FIG. 3. FIG. 3 is a block diagram illustrating encapsulation of a fixed IP address based data packet into a network data packet performed by a sending device in accordance with an embodiment of the present invention.

In step 210 of FIG. 2, the VoIP application 112 resident on mobile communication device 110 sets up a VoIP call with mobile communication device 150. For example, the VoIP application 112 sends to the network operation center 130 a Session Initiation Protocol (SIP) INVITE command which includes the station number of the receiving device. The SIP server 138 in the network operation center 130 maintains a table which includes, for all mobile communication devices registered with the SIP server 138, the station number of the device paired with a virtual IP address.

In a conventional fixed IP address based VoIP application, the IP address a SIP server associates with a given communication device would typically be an actual IP address of a stationary location of the device. As the mobile communication device 150 is a mobile device deployed on a dynamic IP address based wireless carrier network, however, its location can change, and thus it would be undesirable for the SIP server to use the actual IP address utilized by the wireless carrier. The SIP server 138 thus uses a virtual IP address which is, for example, a private address within the local IP address range of the network operation center 130. Accordingly, the SIP server 138 looks up the station number provided by mobile communication device 110 to obtain a virtual IP address $VIP_2$ of mobile communication device 150 device which corresponds to that station number.

The VoIP call is thereafter established upon acceptance by the mobile communication device 150. The call setup communications occur in a conventional manner, except that the data packets used in establishing the call utilize virtual IP addresses and are encapsulated and decapsulated in a manner similar to that for voice data packets as will be described below. Such is also the case for data communications necessary to register mobile communication devices with the network operation center 130, the SIP server 138, and so on. Based on the description to follow, one of ordinary skill will readily apply these concepts, as appropriate, to such communications over the dynamic IP address based network environment as are necessary to provision and register devices, establish and maintain calls, update and manage IP addresses, and so forth.

In step 220, the VoIP application 112 outputs voice data from the voice stream captured from the user (via, for example, a microphone (not shown) resident on mobile communication device 110) in a conventional manner for VoIP communications. In step 230, the operating system 116 packetizes the voice data into fixed IP address based voice data packets. Each such packet is, for example, a VoIP packet 310 as shown in FIG. 3. The VoIP packet 310 includes, potentially among other contents, a VoIP destination IP address 312, a VoIP source IP address 314 and a VoIP payload 316. At this point, the VoIP destination IP address 312 is the virtual IP address $VIP_2$ of the mobile communication device 150, the VoIP source IP address 314 is a current carrier IP address $CIP_1$ of the mobile communication device 110 (as assigned by the carrier associated with wireless carrier network 120) and the VoIP payload 316 contains a portion of the voice data (as selected in normal operation of the VoIP application 112) to be communicated to mobile communication device 150.

Steps 240 through 270 are performed with respect to each VoIP packet 310 generated from the voice stream. In step 240, the mobile encapsulator 118 changes the VoIP source IP address 314 from the carrier IP address $CIP_1$ to the virtual IP address $VIP_1$ of the mobile communication device 110. In step 250, the mobile encapsulator 118 encapsulates the VoIP packet 310 into a sending network packet 320. As shown in FIG. 3, the sending network packet 320 contains, potentially among other contents, a sending network destination IP address 322, a sending network source IP address 324, an a sending network payload 326. At this point, the sending network destination IP address 322 is the IP address $IP_{NOC}$ of the network operation center 130, the sending network source IP address 324 is the carrier IP address $CIP_1$ of the mobile communication device 110, and the sending network payload 326 is the encapsulated VoIP packet 310. In step 260, the mobile communication device 110 sends the sending network packet 320 via, for example, a resident transceiver (not shown) over the wireless carrier network 120 to the network operation center 130. In step 270, steps 240 through 260 are repeated as long as the session lasts and such packets continue to be output by the VoIP application 112.

It should be understood that if, during the call to which the above description applies, the location of mobile communication device 110 changes sufficiently to be assigned a new IP address by the carrier, the value of $CIP_1$ will change accordingly. Because the sending network packets have the dynamic source and destination IP addresses that are used by the sending network, even if the location of the mobile communication device changes, the packets will be correctly interpreted and handled by the voice communication system 100.

Figure 4:
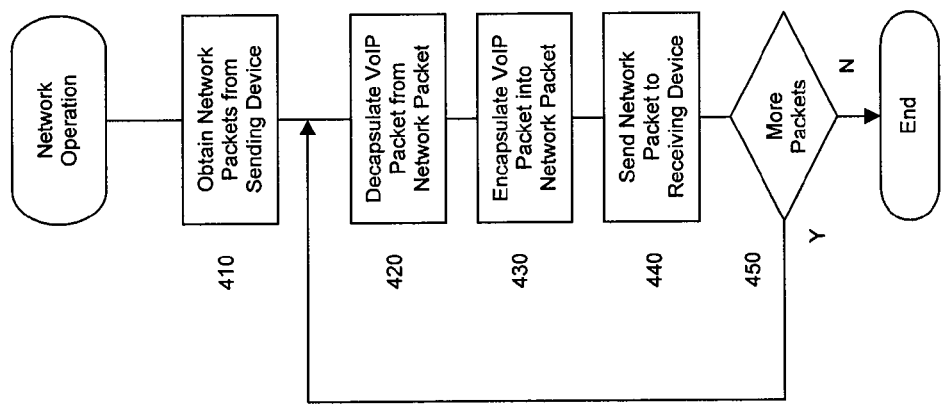
FIG. 4 is a flow diagram illustrating the process performed by a network operation center in accordance with an embodiment of the present invention.

FIG. 4 is a flow diagram illustrating the process performed by a network operation center in accordance with an embodiment of the present invention. The process of FIG. 4 will be described with reference to FIG. 5, which is a block diagram illustrating decapsulation of a fixed IP address based data packet from a sending network data packet and encapsulation of the fixed IP address based data packet into a sending network data packet performed by a network operation center in accordance with an embodiment of the present invention.

In step 410 of FIG. 4, sending network packets 320 are obtained from the mobile communication device 110 over wireless carrier network 120. As explained above, each sending network packet 320 contains a sending network destination IP address 322 which is the IP address $IP_{NOC}$ of the network operation center 130, a sending network source IP address 324 which is the carrier IP address $CIP_1$ of the mobile communication device 110, and a sending network payload 326 which is the encapsulated VoIP packet 310.

Figure 5:
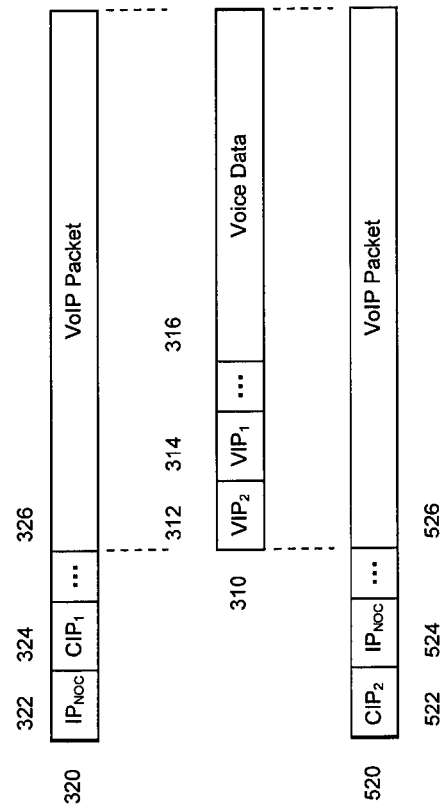
FIG. 5 is a block diagram illustrating decapsulation of a fixed IP address based data packet from a sending network data packet and encapsulation of the fixed IP address based data packet into a receiving network data packet performed by a network operation center in accordance with an embodiment of the present invention.

Steps 420 through 460 are repeated for each sending network packet 320 received from the mobile communication device 110 as long as the call continues. In step 420, as shown in FIG. 5, the voice data controller 132 decapsulates the VoIP packet 310 from the sending network packet 320. In step 430, also as shown in FIG. 5, the voice data controller 132 encapsulates the VoIP packet 310 into a receiving network packet 520 containing a receiving network destination IP address 522, a receiving network source IP address 524 and a receiving network payload 526. At this point, the receiving network destination IP address 522 is the carrier IP address $CIP_2$ of the mobile communication device 150, the receiving network source IP address 524 is the IP address $IP_{NOC}$ of the network operation center 130, and the receiving network payload 526 contains the encapsulated VoIP packet 310.

The voice data controller 132 obtains the carrier IP address of the receiving device from a table it obtains from the administrative server 136 upon startup and continually maintains during operation. The table includes, for each mobile communication device registered with the network operation center 130, the station number and virtual IP address maintained by the SIP server 138, a unique identifier of the mobile communication device which is also stored on the mobile communication device, and the current carrier IP address of the device, which is updated each time the carrier IP address changes. Thus, if there is a change in the location of mobile communication device 150 sufficient to be assigned a new IP address by the carrier, the value of $CIP_2$ will change and mobile communication device 150 will provide the new value of $CIP_2$ to the network operation center 130 to be updated in the table.

In step 440, the network operation center 130 sends the receiving network packet 520 over wireless carrier network 140 to the mobile communication device 150. In step 450, steps 420 through 450 are repeated as long as sending network packets continue to be obtained from mobile communication device 110.

Figure 6:
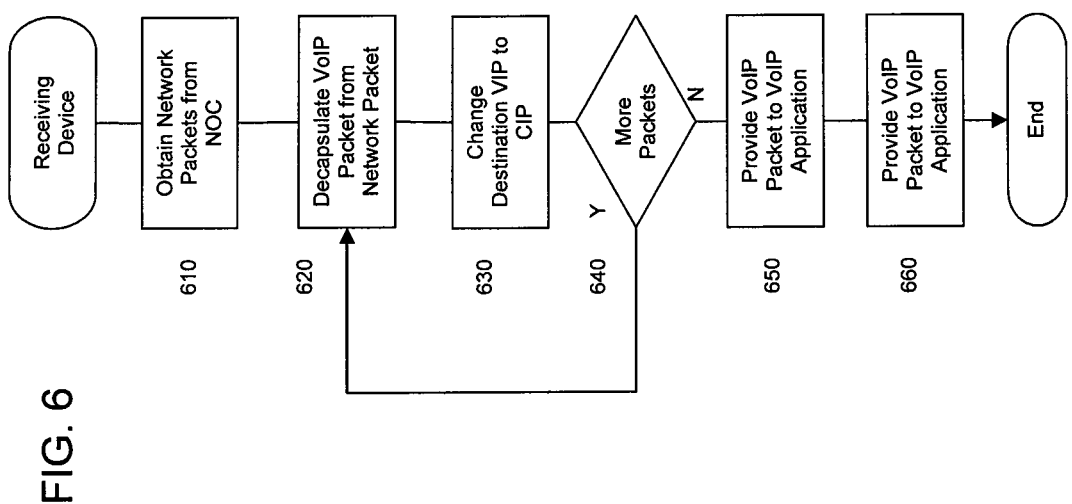
FIG. 6 is a flow diagram illustrating the process performed by a receiving device in accordance with an embodiment of the present invention.

FIG. 6 is a flow diagram illustrating the process performed by a receiving device in accordance with an embodiment of the present invention. FIG. 6 will be described with reference to FIG. 7, which is a block diagram illustrating decapsulation of a fixed IP address based data packet from a receiving network data packet performed by a receiving device in accordance with an embodiment of the present invention.

In step 610, the mobile communication device 150 obtains receiving network packets from the network operation center 130. As described above, each receiving network packet 520 includes the receiving network destination IP address 522 which is the carrier IP address $CIP_2$ of the mobile communication device 150, the receiving network source IP address 524 which is the IP address $IP_{NOC}$ of the network operation center 130, and the receiving network payload 526 which contains the corresponding VoIP packet 310.

Figure 7:
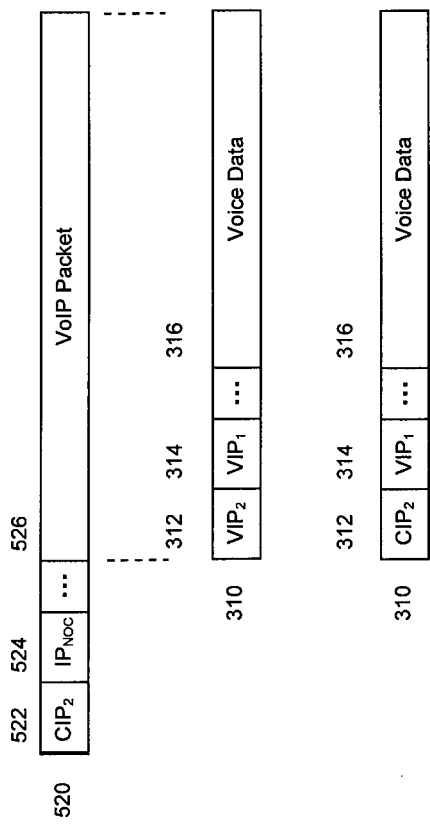
FIG. 7 is a block diagram illustrating decapsulation of a fixed IP address based data packet from a receiving network data packet performed by a receiving device in accordance with an embodiment of the present invention.

Steps 620 through 640 are repeated for each receiving network packet 520 received. In step 620, as shown in FIG. 7, the mobile encapsulator 158 decapsulates the VoIP packet 310 from the receiving network packet 520. In step 630, also as shown in FIG. 7, the mobile encapsulator 158 changes the receiving network destination IP address 522 from the virtual IP address $VIP_2$ to the carrier IP address $CIP_2$ of the mobile communication device 150. In step 640, steps 620 through 630 are repeated as long as the session lasts and receiving network packets continue to be obtained over wireless carrier network 140. In step 650, the operating system 156 de-packetizes the voice data packets, and in step 660, the voice data is provided to the VoIP application 152, which processes the voice stream in a conventional manner to effectuate delivery of the corresponding sound via a speaker (not shown) resident on the mobile communication device 150.

It should be understood that if, during the call described above, the location of mobile communication device 150 changes sufficient to be assigned a new IP address by the carrier, the value of $CIP_2$ will change and, as described above, this change will be reflected by the table used by the voice data controller 132 in routing the receiving network packets to the mobile communication device 150. Thus, even if the location of the receiving device changes, the packets will be correctly interpreted by the voice communication system 100 and correctly routed to the receiving device.

In alternative embodiments of the invention, only a first mobile communication device may be connected via a dynamic IP address based wireless carrier network, while a second device in communication with the first device is connected via a non-packet based network or a fixed IP address based network. For example, the mobile communication device 110 may be connected to the network operation center 130 via the dynamic IP address based wireless carrier network 120 (and send voice data packets to and from the network operation center 130 applying the encapsulation and decapsulation method described above) whereas the mobile communication device 150 is connected to the network operation center 130 by a non-packet based network (such as a conventional Public Switched Telephone Network (PSTN) network) in which case the network operation center 130 would convert the voice data to/from the appropriate non-packet based format, Alternatively, the mobile communication device 110 may be connected to the network operation center 130 via the dynamic IP address based wireless carrier network 120 (as described above) whereas the mobile communication device 150 is connected to the network operation center 130 by a fixed IP address based network (such as a stationary VoIP connection via cable modem or ISDN) in which case the fixed IP address based data packets could be sent/received to/from the mobile communication device 150 without requiring encapsulation and decapsulation on that end.

In yet another embodiment, either or both networks on which the mobile communication devices are deployed could be a non-wireless dynamic IP address based network, such as a ubiquitously distributed wired network to which mobile communication devices can maintain a short range connection even while mobile, changing IP addresses when moving from a location proximate to one portion of the network to a location proximate to another portion of the network.

Additional advantages can be provided by adding security features to the voice communication system 100 such as firewalls, encryption, etc. The mobile communication device 110, the mobile communication device 120, and/or the network operation center 130 may include means to encrypt and decrypt the voice data, compress and decompress the voice data, and so forth. Furthermore, the method and system described herein may be configured to meet requirements of the Secure Communication Interoperability Protocol (SCIP) and potentially other present or future standards and requirements for providing security and other advantages.

For example, the method and system described herein may be applied to encapsulate and decapsulate fixed IP address based SCIP voice data packets for communication over a dynamic IP address based network in an environment sufficiently configured to comply with SCIP requirements. U.S. patent application Ser. Nos. 12/553,901 and 123,553,908, for example, describe methods and means for providing SCIP compliant VoIP communication based on commercially available mobile communication devices which are hereby incorporated by reference.

The invention has been described above with reference to one or more illustrative embodiments. Based on this description, further modifications and improvements may occur to those skilled in the art. The claims are intended to cover all such modifications and changes as fall within the scope and spirit of the invention. Unless otherwise stated or implied, function components of the invention may be implemented as hardware, software, firmware or some combination thereof as will be found appropriate and practicable by one of ordinary skill in the art.

What is claimed is:

1. A mobile communication device for communicating voice data, the mobile communication device comprising:
    a mobile encapsulator encapsulating a fixed internet protocol (IP) address based voice data packet containing
        a fixed source IP address of the mobile communication device,
        a fixed destination IP address of a receiving device, and
        a voice data payload
    into a sending network voice data packet containing
        a sending network source IP address of the mobile communication device,
        a sending network destination IP address of an intermediate system, and
        the fixed IP address based voice data packet; and
    a transmitter for providing the sending network voice data packet over a first dynamic IP address based network to the intermediate system for decapsulating the fixed IP address based voice data packet from the sending network voice data packet, encapsulating the fixed IP address based voice data packet into a receiving network voice data packet and providing the receiving network voice data packet over one of the first dynamic IP address based network and a second dynamic IP address based network to the receiving device.

2. The mobile communication device of claim 1 wherein the fixed IP address based voice data packet is a Secure Communication Interoperability Protocol data packet.

3. The mobile communication device of claim 1 wherein at least one of the first dynamic IP address based network and second dynamic IP address based network is a wireless carrier network.

4. The mobile communication device of claim 1, further comprising a receiver for obtaining, from the intermediate system over the first dynamic IP address based network, voice data obtained by the intermediate system from the receiving device over the second dynamic IP address based network.

5. The mobile communication device of claim 1 wherein the fixed IP address based voice data packet is a VoIP data packet.

6. A mobile communication device for communicating voice data, the mobile communication device comprising:
    a mobile encapsulator encapsulating a fixed internet protocol (IP) address based voice data packet containing
        a fixed source IP address of the mobile communication device,
        a fixed destination IP address of a receiving device, and
        a voice data payload comprising a portion of the voice data
    into a sending network voice data packet containing
        a sending network source IP address of the mobile communication device,
        a sending network destination IP address of an intermediate system, and
        the fixed IP address based voice data packet; and
    a transmitter for providing the sending network voice data packet over a dynamic IP address based network to the intermediate system for decapsulation of the fixed IP address based voice data packet from the sending network voice data packet and communication of the voice data to the receiving device.

7. The mobile communication device of claim 6 wherein the fixed IP address based voice data packet is a VoIP data packet.

8. The mobile communication device of claim 6 wherein the fixed IP address based voice data packet is a Secure Communication Interoperability Protocol data packet.

9. The mobile communication device of claim 6 wherein the transmitter is configured for providing the sending network voice data packet to the intermediate system for, upon decapsulation of the fixed IP address based voice data packet from the sending network voice data packet, sending the fixed IP address based voice data packet to the receiving device over a fixed IP address based network.

10. The mobile communication device of claim 6 wherein the intermediate system comprises a media gateway that converts the voice data for communication over a non-packet based network.

11. A method for communicating voice data, the method performed by a mobile communication device and comprising the steps of:
- encapsulating a fixed internet protocol (IP) address based voice data packet containing
  - a fixed source IP address of the mobile communication device,
  - a fixed destination IP address of a receiving device, and
  - a voice data payload comprising a portion of the voice data
  into a sending network voice data packet containing
  - a sending network source IP address of the mobile communication device,
  - a sending network destination IP address of an intermediate network, and
  - the fixed IP address based voice data packet; and
- providing the sending network voice data packet over a first dynamic IP address based network to the intermediate system for decapsulating the fixed IP address based voice data packet from the sending network voice data packet, encapsulating the fixed IP address based voice data packet into a receiving network voice data packet and providing the receiving network voice data packet over one of the first dynamic IP address based network and a second dynamic IP address based network to the receiving device.

12. The method of claim 11 wherein the step of encapsulating a fixed IP address based voice data packet comprises encapsulating a VoIP data packet.

13. The method of claim 11 wherein the fixed IP address based voice data packet is a Secure Communication Interoperability Protocol data packet.

14. The method of claim 11 wherein at least one of the first dynamic IP address based network and second dynamic IP address based network is a wireless carrier network.

15. The method of claim 11, further comprising the step of obtaining, from the intermediate system over the first dynamic IP address based network, voice data obtained by the intermediate system from the receiving device over the second dynamic IP address based network.

16. A method for communicating voice data, the method performed by a mobile communication device and comprising the steps of:
- encapsulating a fixed internet protocol (IP) address based voice data packet containing
  - a fixed source IP address of the mobile communication device,
  - a fixed destination IP address of a receiving device, and
  - a voice data payload comprising a portion of the voice data
  into a sending network voice data packet containing
  - a sending network source IP address of the mobile communication device,
  - a sending network destination IP address of an intermediate system, and
  - the fixed IP address based voice data packet; and
- providing the sending network voice data packet over a dynamic IP address based network to the intermediate system for decapsulation of the fixed IP address based voice data packet from the sending network voice data packet and communication of the voice data to the receiving device.

17. The method of claim 16 wherein the fixed IP address based voice data packet is a VoIP data packet.

18. The method of claim 16 wherein the fixed IP address based voice data packet is a Secure Communication Interoperability Protocol data packet.

19. The method of claim 16 wherein the step of providing comprises providing the sending network voice data packet to the intermediate system for, upon decapsulation of the fixed IP address based voice data packet from the sending network voice data packet, sending the fixed IP address based voice data packet to the receiving device over a fixed IP address based network.

20. The method of claim 16 wherein the step of providing comprises providing the sending network voice data packet to the intermediate system for converting the voice data for communication over a non-packet based network.

* * * * *